No. 728,656. PATENTED MAY 19, 1903.
E. BAUSCH & G. HOMMEL.
MICROTOME.
APPLICATION FILED MAY 6, 1901.
NO MODEL. 5 SHEETS—SHEET 1.
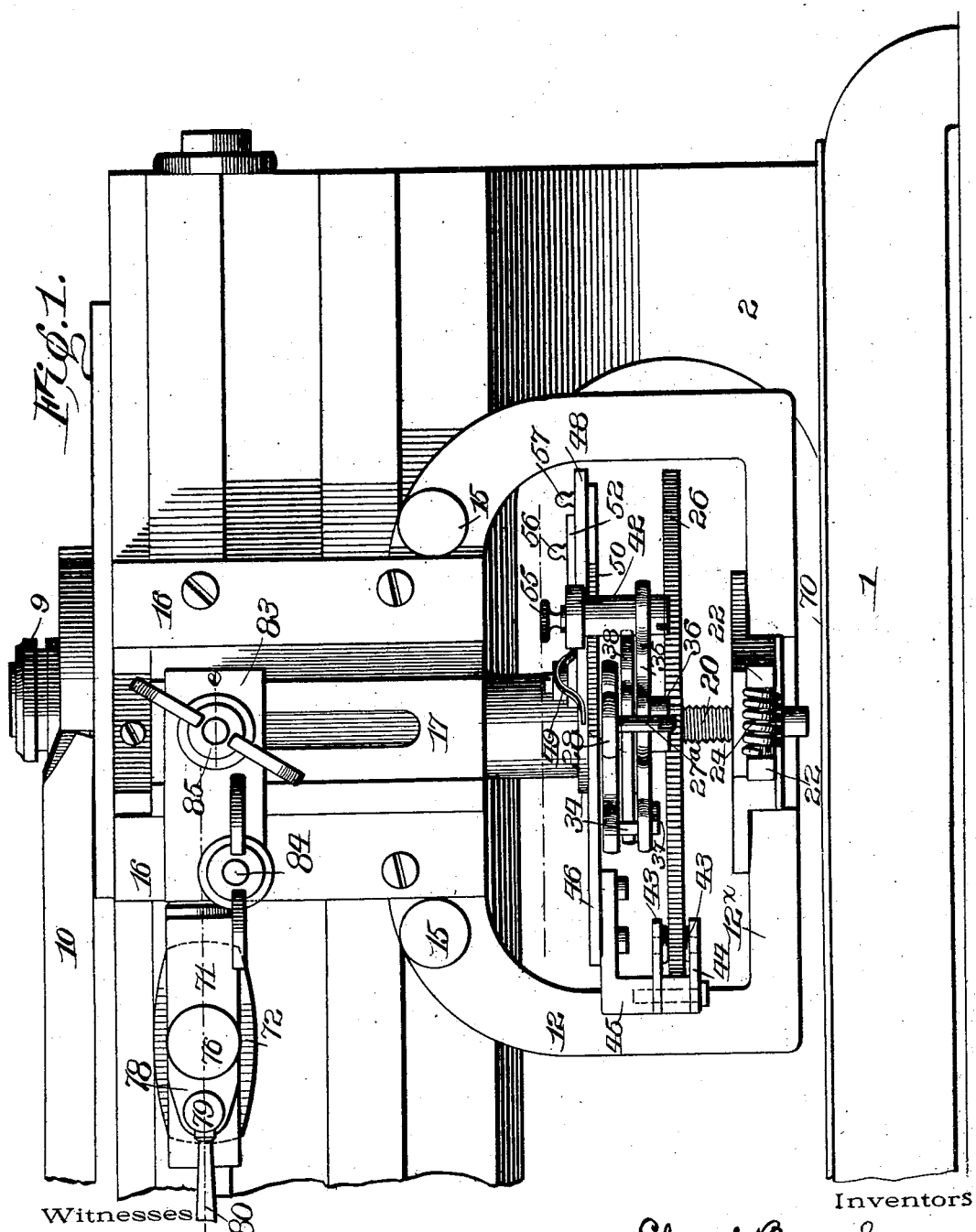
Witnesses Inventors No. 728,656. PATENTED MAY 19, 1903.
E. BAUSCH & G. HOMMEL.
MICROTOME.
APPLICATION FILED MAY 6, 1901.
NO MODEL. 5 SHEETS—SHEET 2.
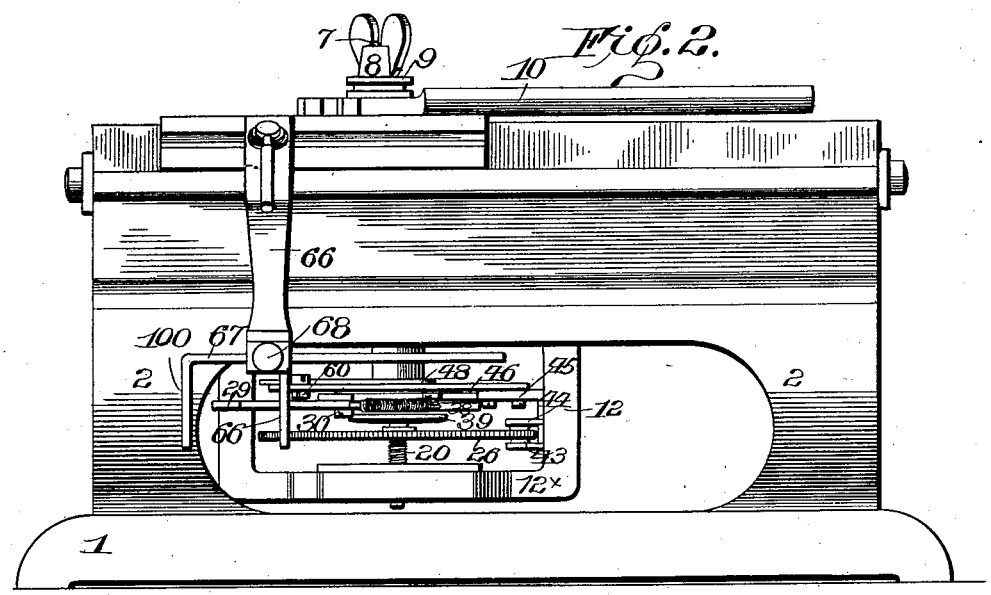
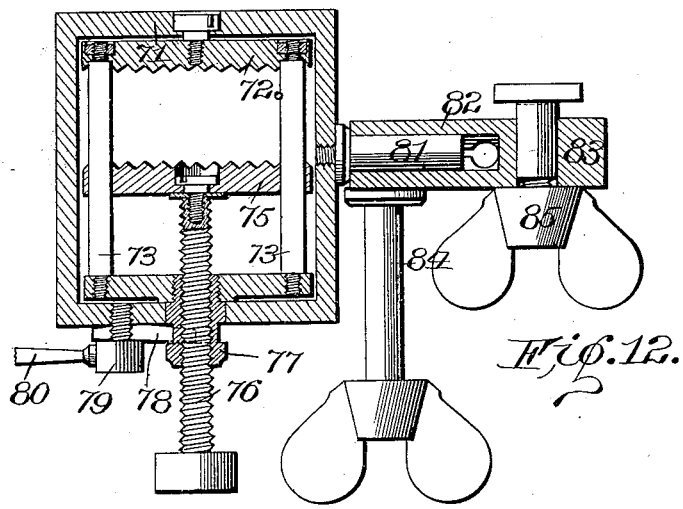
Witnesses.
Walker B. Payne.
G. Willard Rich.
Inventors
Edward Bausch
George Hommel
by Frederick S. Church
their Attorney.

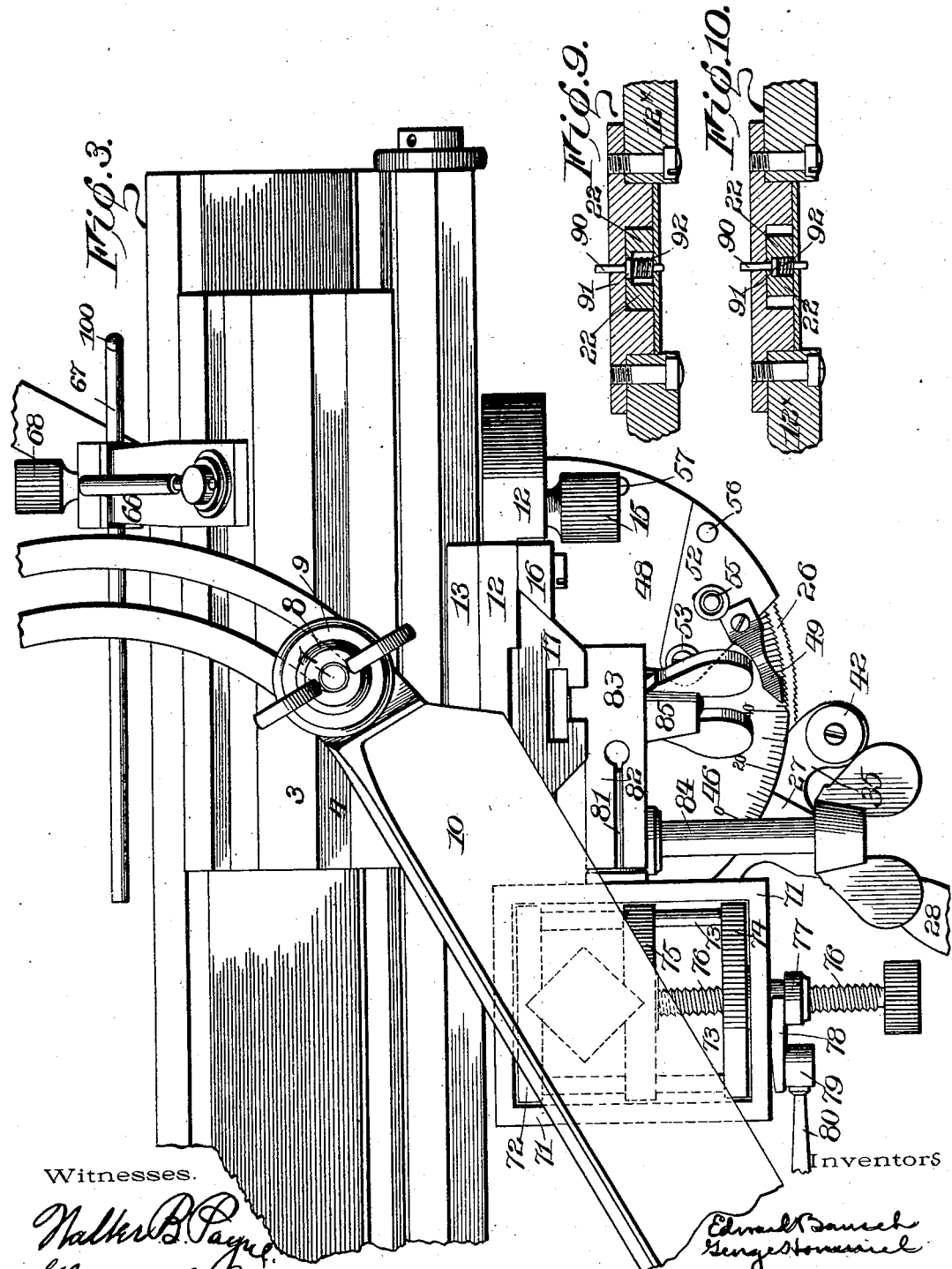

No. 728,656. PATENTED MAY 19, 1903.
E. BAUSCH & G. HOMMEL.
MICROTOME.
APPLICATION FILED MAY 6, 1901.
NO MODEL. 5 SHEETS—SHEET 4.
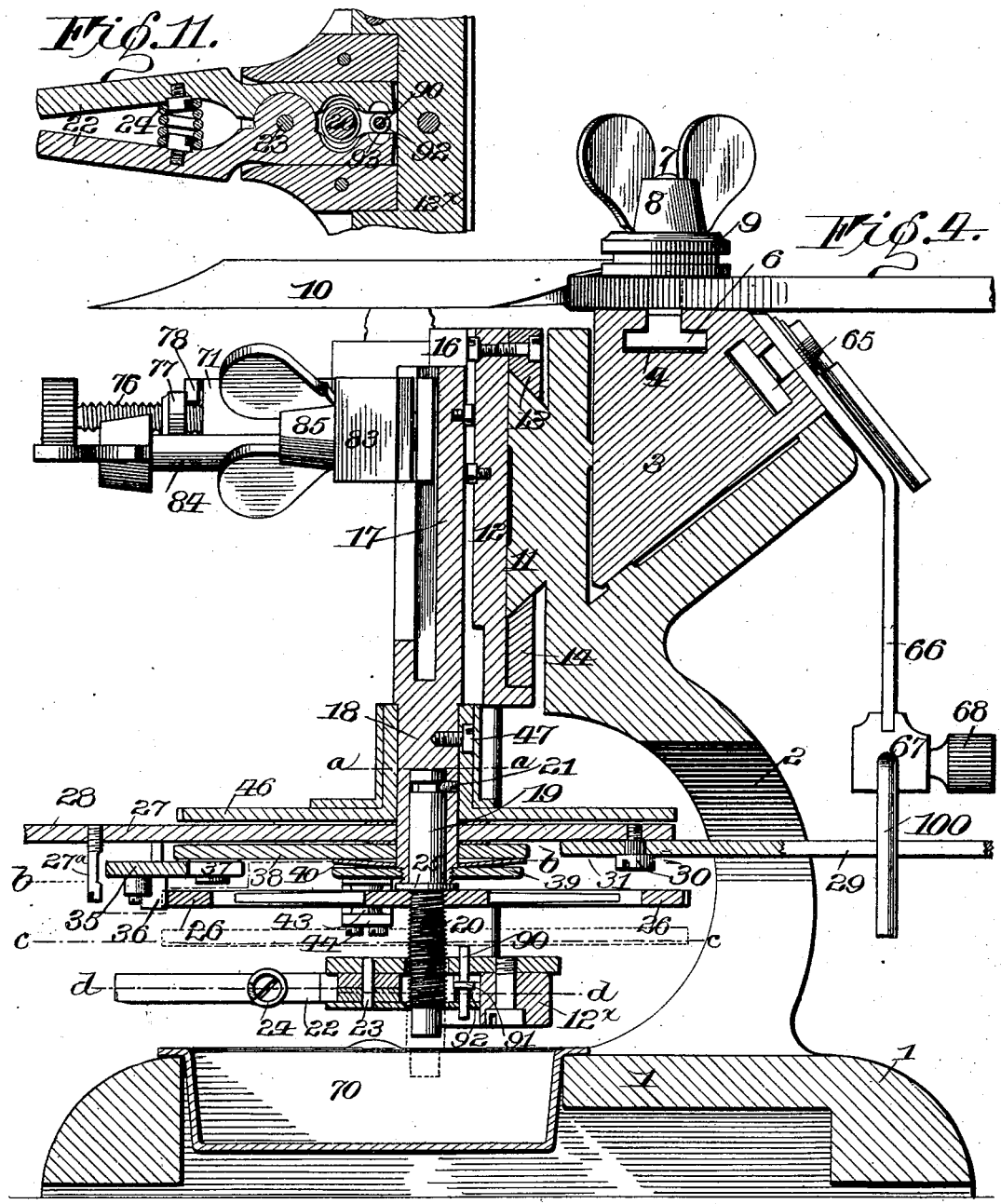
Witnesses. Inventors
Walter B. Payne Edward Bausch
G. Willard Rich. George Hommel
by Frederick F. Church
their Attorney.

No. 728,656. PATENTED MAY 19, 1903.
E. BAUSCH & G. HOMMEL.
MICROTOME.
APPLICATION FILED MAY 6, 1901.
NO MODEL. 5 SHEETS—SHEET 5.
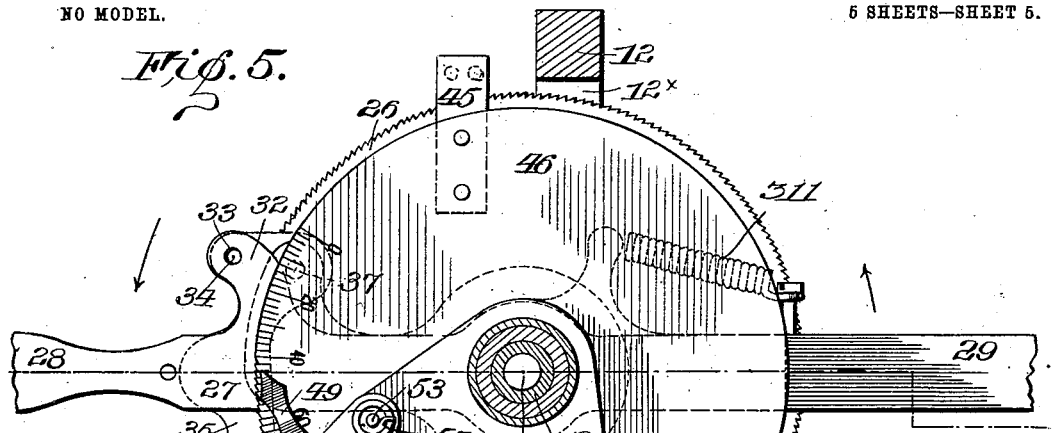
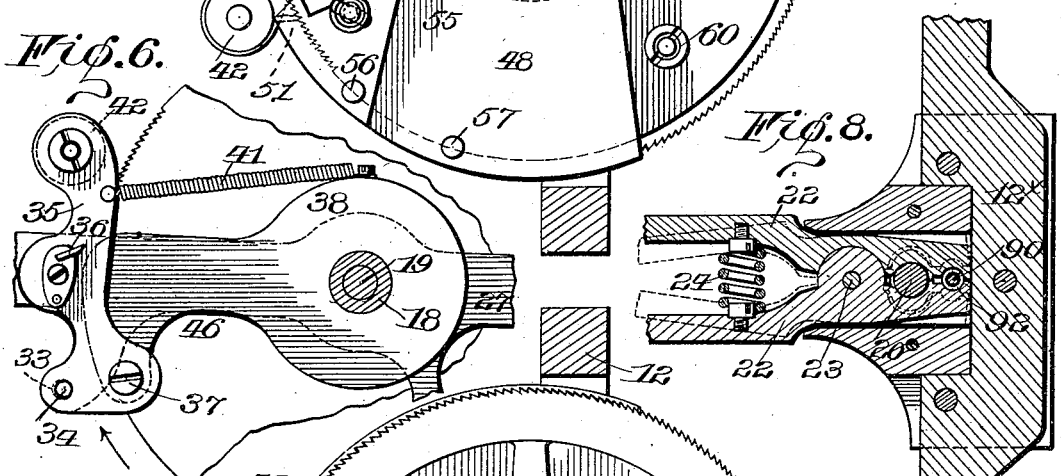
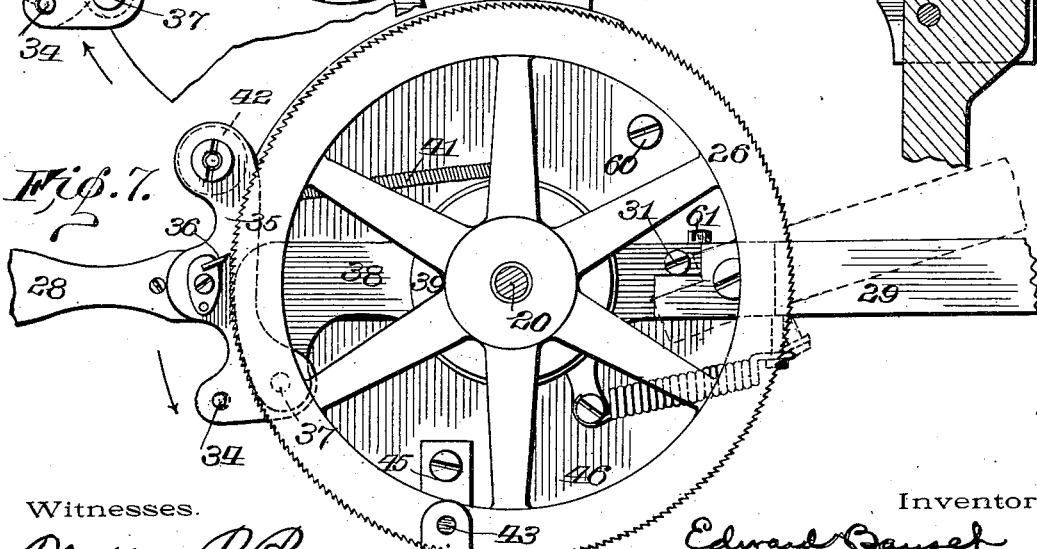
Witnesses. Inventors No. 728,656. Patented May 19, 1903.

UNITED STATES PATENT OFFICE.

EDWARD BAUSCH AND GEORGE HOMMEL, OF ROCHESTER, NEW YORK, ASSIGNORS TO BAUSCH & LOMB OPTICAL COMPANY, OF ROCHESTER, NEW YORK, A CORPORATION OF NEW YORK.

MICROTOME.

SPECIFICATION forming part of Letters Patent No. 728,656, dated May 19, 1903.

Application filed May 6, 1901. Serial No. 58,848. (No model.)

*To all whom it may concern:*

Be it known that we, EDWARD BAUSCH and GEORGE HOMMEL, of Rochester, in the county of Monroe and State of New York, have invented certain new and useful Improvements in Microtomes; and we do hereby declare the following to be a full, clear, and exact description of the same, reference being had to the accompanying drawings, forming a part of this specification, and to the reference-numerals marked thereon.

Our present invention relates to microtomes for cutting sections of materials to be subjected to microscopic examination; and it has for its object to provide an improved mechanism capable of such adjustments that the sections may properly be cut with the object held in any desirable position or angle, and also means for causing the positive feed relative to the knife of the material being cut.

It further has for its object to provide for the relative adjustment of the knife and object-carriage by the movement of the micrometer-screw relative to its nut, so that the carriage may be moved or returned to the extremes of its relative movement quickly.

The invention has further for its object to provide improved means for causing the relative movements of the cutting-knife and the object operated upon automatically, thereby adapting it perfectly for serial sectioning; and it further consists in certain details of construction and combinations of parts, all as will be hereinafter fully described, and the novel features pointed out in the claims at the end of this specification.

In the accompanying drawings, Figure 1 is a front elevation of one end of the main frame and the carriage of our improved microtome; Fig. 2, a rear elevation of the same; Fig. 3, a plan view; Fig. 4, a vertical sectional view taken transversely of the ways and centrally through the carriage and feeding devices; Fig. 5, a sectional view taken on the line $a\ a$ of Fig. 4 looking down; Fig. 6, a sectional view on the line $b\ b$ of Fig. 4 looking up; Fig. 7, a sectional view on the line $c\ c$ of Fig. 4 looking up; Fig. 8, a sectional view on the line $d\ d$ of Fig. 4 looking up. Figs. 9 and 10 are vertical sectional views of the rear portion of the divided nut and the devices for holding it separated. Fig. 11 is a horizontal sectional view similar to Fig. 8, showing the sections of the divided nut held separated to permit the free adjustment of the screw and nut relatively. Fig. 12 is a sectional view on the line $e\ e$ of Fig. 1.

Similar reference-numerals in the several figures indicate similar parts.

Our present improvements relate principally to the means for causing and controlling relative adjustments of the knife and the object-holder to determine the thickness of the sections cut, and it is therefore immaterial whether the knife is connected rigidly to a stationary frame and the object is moved to sever the sections, as in the well-known Minot microtome, or the object-holder is rigidly held and the knife reciprocated over or past it; but in the present embodiment we have shown the improvements applied to our instrument of the latter class.

The general construction of the main frame of our present instrument is not essentially different from that shown in Letters Patent No. 325,722, dated September 8, 1885, embodying the lower portion or base 1, having the curved standards 2 near the ends and at the rear upper portion having a V-shaped way in which operates the sliding knife block or carriage 3, said block having the undercut way or groove in its upper side, in which operates a clamping-block 6, provided with a screw 7, a thumb-nut 8, and a washer 9 for adjustably holding the cutting-knife 10 in position, as shown particularly in Figs. 3 and 4, the construction of the object-clamp being shown in dotted lines in Fig. 3. Upon the front side of the upper portion of the main frame is provided a dovetailed way or projection 11, upon which is adjustably secured the frame 12 by means of the gibs 13 and 14, the latter secured by the thumb-screws 15, so that by loosening these the frame 12 may be adjusted upon its ways and secured in any desired position relative to the length of the knife-block ways. To the front of the upper portion of the frame 12 are secured gibs 16, forming a dovetailed way in which is arranged a carriage or slide 17, to which the object-holder is mediately attached, the lower end of said carriage being formed into a cylindrical stem, post, or arbor 18, having a recess in its lower end, in which operates the upper smooth end 19 of the micrometer-screw 20, said screw being permitted a free rotation therein, but prevented from longitudinal movement by a screw or pin 21, passing through the cylindrical extension of the carriage, entering an annular slot or recess formed in the upper end of the screw, as shown in Fig. 4. The extreme lower end of the micrometer-screw 20 is made smooth or unthreaded, as shown, and the threaded portion coöperates with a nut or nut-sections detachable from the screw and in the present arrangement extends through a divided separable nut mounted in the lower or horizontal portion 12$^\times$ of the frame 12. The threaded sections of the nut shown are formed in the rear proximate ends of arms or levers 22, pivoted on a pin or stud 23 and extended forward to form operating-handles, the handle portions being separated by a spring 24, which normally holds the sections of the nut in engagement with the micrometer-screw. (See Figs. 4 and 8.) It will be seen that the rotation of the micrometer-screw will operate the carriage 17 relatively to the plane of operation of the cutting-knife, and as the object to be cut is mounted upon this carriage a movement of the screw through a determinate distance each time that the knife is moved to cut a section (and after the cutting operation) will cause sections of definite thicknesses to be severed at each cut. It will also be noted that when the carriage and the object carried thereby have reached the extreme of their vertical movement the carriage may be returned to lowermost position by drawing together the outer ends of the nut-levers 22 against the tension of the spring 24, thereby allowing the carriage to return by gravity to first or normal position, with the major portion of the micrometer-screw below the nut, so that when a different object has been applied or a readjustment of the other one has been made the carriage may be fed up as before. As the principal object of disengaging the nut and micrometer-screw is to permit the rapid return of the micrometer-screw and the carriage to the starting position (in the present embodiment the lowermost) and, as shown, this separation of the nut-sections is accomplished by hand, it is desirable to prevent the nut from being brought into contact with the screw during the descent or return of the carriage, as otherwise the delicate threads might be damaged, and for this purpose we provide between the sections of the nut an automatic holding device or catch in the form of a longitudinally-movable pin 90, guided in the nut-frame between the nut-sections, having a shoulder or collar 91 thereon and moved vertically by a spring 92, arranged between the collar and the lower plate, the upper end of said pin extending above the nut and into position to be struck and operated downwardly by a part connected to the carriage or screw—such, for instance, as the operating-wheel 26 on the screw. When the carriage is in lowermost position, the pin 90 is pressed downward against its spring, and the collar thereon lies below shoulders 93 on the nut-sections, as in Fig. 10, the nut then engaging the screw, as in Fig. 8, and the carriage will be operated by the rotation of the latter; but when the operator separates the nut from the carriage the holding device 90 will be moved upwardly by its spring and the shoulder 91 thereon will be raised between the shoulders 93 on the nut, as in Figs. 9 and 11, preventing their engagement accidentally or otherwise with the screw until the pin is moved downwardly again by the return of the carriage or otherwise.

Secured rigidly to the micrometer-screw and in contact with a stationary collar or shoulder 25 thereon is the progressively-movable actuating wheel or member 26, preferably of large diameter and having on its periphery ratchet-teeth, the spaces between which and the pitch of the threads on the micrometer-screw maintain such relation that a movement of said wheel through the space of one tooth will cause the elevation of the carriage one micron or other desired unit. The means employed for rotating the micrometer-screw are preferably such that not only will the operating device engage the wheel positively, but after moving it a determinate distance will be positively disengaged therefrom, and if said operating device is reciprocatory or oscillatory, as is preferred, will return to its position to again engage said wheel out of contact with the teeth of the latter, so they will not be mutilated or worn, because in an instrument of this character it is eminently desirable that the fine adjusting and operating parts be protected from unnecessary wear or damage. The screw-operating devices in the present construction embody an oscillatory arm or lever 27, preferably pivoted upon the extension 18 of the carriage and capable of oscillation thereon in both directions, said lever having at its front end an operating-handle 28 and at its rear an extension-arm 29, pivoted upon a screw 30, mounted on the main lever, said lever and extension having a shoulder adapted to engage a pin or stop 31 on the main lever and connected by the spring 311, so as to permit the arm 29 to yield laterally in one direction without operating the lever, as indicated in dotted lines in Fig. 7, for a purpose to be described. Near the forward portion of the lever it is provided with a lateral extension 32, having an aperture 33 therein, in which operates a pin 34 on a plate 35. This plate has upon its under side a pawl or dog 36, inclined, as shown, relative to the axis of the ratchet-wheel 26 and adapted to engage the teeth thereof to rotate the latter, and is pivoted at 37 upon a pawl-carrier or arm 38, pivoted loosely upon the stud 18 of the carriage, and between said carrier and a collar 39, rigidly secured to the carriage-stud, is a spring-washer 40, offering frictional resistance only to the rotation of the former. 41 indicates a spring connected to the outer free end of the plate 35 and to the carrier 38, Fig. 6, and having a tendency to draw the pawl into engagement with the ratchet-wheel, and the outer end of the plate 35 is provided with a vertically-extending stud or projection having at its upper end a friction-roller 42, adapted to coöperate with a pawl-releasing device, which will be described. The relations of the pivotal pin 37 of the plate 35 on the carrier 38, the pin 34 thereon, the recess 33 in the operating-lever 27, and the centers of motion of the carrier 38 and lever 27 are such that when said lever is moved in the direction of the arrow, Fig. 5, to cause the upward movement of the micrometer-screw, the carrier 38 being retarded by friction-washers 40 and the pin 34 being at a greater distance from the center of motion than the pivotal pin 37 of the plate 35, a movement of the lever will throw the pawl into engagement with the teeth of the feed-wheel, and during the movement of the lever the wheel will be carried around until the pawl is released by means to be described. Then as the lever is oscillated in the opposite direction, the movement of the carrier 38 being retarded, the free outer end of the plate 35 will be thrown outward and the pawl disengaged from the teeth of the ratchet or feed wheel, the outward movement of the plate being limited by a suitable stop or pin 27ᵃ on the lever 27. Thus it will be seen that the oscillation of the lever will turn the screw feed-wheel in one direction, but the disengagement of the pawl and ratchet-wheel will be automatically accomplished when moved in the other. In order to prevent excessive motion of the screw feed-wheel or an overthrow caused by a quick motion of the pawl, we provide a friction-brake between the ratchet-wheel and the carriage 17 in the form of pads 43, preferably of cork or leather, arranged to engage the opposite faces of the ratchet-wheel and secured to the arms 44 of a bracket 45, attached to a disk or plate 46, which latter is in turn provided with a sleeve or cylindrical extension encircling the extension 18 of the carriage 17 and secured rigidly by a screw 47, as shown in Fig. 4.

48 indicates a segmental stop or pawl-releasing plate or arm adjustable around the tubular extension of the plate 46 and having its periphery substantially concentric with the periphery of the wheel 26. The edge of this plate or a part connected thereto is adapted to engage the projection or wheel 42 on the plate 35 and disengage the pawl from the feed-wheel 26 during the oscillation of the operating arm or lever 27 in one direction, and as the stop-plate is adjustable upon the center of oscillation of the lever the distance of the movement of the micrometer-screw and the thickness of the sections to be cut may be readily regulated by adjusting this releasing-stop a determinate distance from the point of engagement of the lever and wheel, and we therefore provide a scale and index between the pawl-releasing stop and the stationary carriage for enabling this result to be accomplished. In addition to the capacity of adjustment of the stop it should be held rigidly, so that there is no possibility of its slipping or becoming disengaged, and to accomplish these results and to simplify the construction we provide the plate 46 with indications forming a scale, the ratio between the indications being practically equal to the teeth on the wheel and with which coöperates an index or finger 49, secured mediately to the stop-plate 48, and also provide serrations, (indicated by 50 on the plate 46,) with which serrations is adapted to coöperate a pawl or projection 51, arranged on the under side of a plate 52, pivoted at 53 to the stop-plate 48. A spring 54, encircling the pivot of this plate 52, tends to throw the stud or pawl thereon into engagement with the serrations 50 to maintain the parts locked, and the periphery of the plate is substantially concentric with that of the plate 48 and of the wheel 26 when the parts are in normal position, so that in passing around the stud on the plate 35 will engage the edge of the plate 52, and the pawl being released from the wheel 26 the stud or roller 42 will pass around it, the pawl being held out of engagement, as described. It will be noted that the teeth on the plate 46, the projection 51 on the plate 52, and the pivot of the latter plate are so relatively arranged that the action of the pawl will tend to move the projections toward the bottom of the teeth, and thereby hold the stop-plate rigidly. The plate 52 may be locked in position, if desired, by a set-screw 55, passing through jaws therein and entering the plate 48.

56 and 57 indicate studs or pins on the plates 52 and 48, respectively, whereby the positive movement and release of these parts is facilitated. The movements of the oscillatory lever 27 are limited by a stop pin or screw 60, secured to the under side of the plate 46, an adjustable screw or stop 61 on said lever serving to accurately adjust the relation between the parts, so as to insure the lever returning to the same stopping-point at each feeding operation. The feed of the object-carrier may be caused either automatically by the movement of the knife, or the movement of the knife may be caused by the movement of the lever 27, this of course taking place after the cutting operation, the power being applied to either, and to accomplish this we provide in the rear side of the knife-block a T-shaped groove, in which is adjustably secured a block 65, carrying a downwardly-extending arm 66, adapted to coöperate with the extension 29 of the operating-lever when the knife-block is moved to cut a section from the object, the spring 311 being strong enough to carry the operating-lever 27 under ordinary circumstances; but if for any reason the lever cannot operate or in the event that the carriage moves too far said extension will yield on its pivot and prevent damage to the parts. The arm 66 is provided with an adjustable stop-arm 67, adapted to be secured in position by a screw 68, the downward extension 100 of this arm serving to engage the lever extension 29 when the knife-block is moved in the opposite direction. The relation of these operating-stops to each other and to the knife-block may be adjusted by the means described, so as to cause the feed of the object at any portion of the stroke of the knife-block. The portion 29 of the feed-operating lever is rigid when the knife is returning to first position after a section has been cut and while the feed of the object is being accomplished, so that the positive operation of the knife to cut and of the feeding device may be accomplished by the movement of the handle 28.

It will be understood that the knife 10 and the object carrier or holder may be of any suitable construction; but we prefer the form shown. The holder proper embodies a rectangular frame 71, within which is arranged a pivoted frame consisting of a stationary clamping-jaw 72, rigidly connected to the guide-rods 73, the latter being connected at their forward ends to a plate or bar 74, said rods 73 forming guides for the movable clamping-jaw 75, operated toward and from the stationary clamping-jaw by the adjusting-screw 76. The stationary clamping-jaw 72 is, as usual, pivoted at its rear side on a screw in axial alinement with the adjusting or clamping screw 76, and said clamping-screw passes through and is engaged with the thread upon a nut 77, secured to the plate 74 and passing loosely through an aperture in the plate 71. The nut 77 is provided with a shoulder or collar, between which and the outer side of the frame 71 is arranged a clamping-yoke 78, the outer end of which is adapted to be moved toward the frame by a set-screw 79, having an operating-handle 80, as shown, these parts being of the usual construction and forming no part of our invention.

From the above construction it will be seen that the clamping-jaws may be moved relatively by the operation of the clamping-screw 76 to hold the object, and that the said jaws may, if desired, be oscillated or adjusted about the axis of the screw 76 to change the plane of the jaws relative to that of the frame 71, and that the frame carrying the jaws may be secured when adjusted on its axis by the set-screw 79.

The means for holding and adjusting the frame 71 are also of the usual construction, the latter being provided on one side with a pin or projection 81, extending into a cylindrical recess between the clamping-jaws 82 of a clamp-arm 83, said jaws being drawn together about the pin 81 by the clamping-screw 84. The clamping-arm 83 is vertically adjustable in a T-shaped groove or way formed in the front of the carriage 17 and held in adjusted position by a thumb-nut 85. The means described are such that a universal movement or adjustment is permitted the object relative to the plane of operation of the knife, so that sections may be cut therefrom in a plane or manner desired without removing it from the clamping-jaw.

The lower portion of the base of the instrument is cut away to form a recess for a pan or receptacle 70 to receive the cuttings.

Although we have shown and described the engaging tooth or pawl 36 on the plate 35 as separately constructed and applied, it will be understood that as far as the operation of the parts is concerned these constitute a pawl which is pivoted on what we have termed the "pawl-carrier" 38 and is also pivoted to the operating member. It is immaterial, as far as the operation is concerned, whether the pawl as thus understood is actually supported on the carrier 38 or on the member 27, although we prefer the construction shown.

We claim as our invention—

1. In an instrument of the class described, the combination with an object-carriage and a relatively movable knife for operating upon the object, of a step-by-step feeding device for the carriage embodying a member progressively movable in one direction, an oscillatory member and a pawl pivoted independently of the oscillatory member and moved by the latter into positive engagement with the first-mentioned member when operated thereby in one direction and automatically thrown out of engagement when operated in the opposite direction.

2. In an instrument of the class described, the combination with a movable object-carriage, of a feed device therefor embodying a progressively-movable wheel, an oscillatory member and a pawl supported independently of the member and arranged between the latter and the wheel, said pawl being actuated positively into engagement with the wheel when the member is moved in one direction only.

3. In an instrument of the class described, the combination with the relatively movable object-carriage and knife, of mechanism for causing the relative feed of the knife and carriage, embodying a progressively-movable member, an oscillatory member and a pawl pivoted independently of but moved by the latter for causing their positive engagement when moved in one direction and their positive disengagement when moved in the opposite direction.

4. In an instrument of the class described, the combination with the relatively movable object-carriage and knife, of a mechanism for causing the relative feed of the knife and carriage, embodying a progressively-movable member, an oscillatory operating member, a part operated by the latter to positively engage the first-mentioned member when moved in one direction and to positively disengage it when moved in the opposite direction and adjustable means for disengaging the part from the progressively-movable member at any predetermined point during the movement of the operating member.

5. In an instrument of the class described, the combination with the relatively movable object-carriage and knife, of a mechanism for causing the relative feed of the knife and carriage embodying a ratchet-wheel, an oscillatory operating member, a pawl-carrier, movable independently of the operating member, a pawl thereon coöperating with the ratchet-wheel and actuated toward and from and circumferentially of the wheel by the operating member.

6. In an instrument of the class described, the combination with the relatively movable object-carriage and knife, of a mechanism for causing the relative feed of the knife and carriage, embodying a ratchet-wheel, an oscillatory operating member, a pawl-carrier, movable independently of the operating member, a pawl thereon coöperating with the ratchet-wheel and actuated positively into and out of engagement with the wheel by the operating member.

7. The combination with the relatively movable object-carriage and knife, of a mechanism for causing the relative feed of the knife and carriage, embodying a toothed feed-wheel, an oscillatory pawl-carrier, a pawl movable thereon and an oscillatory member coöperating with the pawl eccentrically of its pivot to move it positively into and out of engagement with the wheel and operate the wheel in one direction.

8. The combination with the relatively movable object-carriage and knife, of a mechanism for causing the relative feed of the knife and carriage embodying a feed-wheel, an oscillatory pawl-carrier pivoted on the axis of the wheel, a pawl pivoted on the carrier, an oscillatory actuating member pivoted on the axis of the wheel and connected to the pawl eccentrically of its pivot to move it into and out of engagement with the wheel when oscillated in opposite directions.

9. The combination with the relatively movable object-carriage and knife, of a mechanism for causing the relative feed of the knife and carriage, embodying a movable feed-wheel, a pivoted pawl-carrier, a pawl pivoted thereon, a spring operating on the pawl, an oscillatory operating member connected to the pawl eccentrically of its pivot and moving it toward and from the wheel when oscillated.

10. In a feeding mechanism for microtomes, the combination with a feed-wheel, of a pawl-carrier mounted on an axis concentric therewith, a pawl on the carrier adapted to coöperate with the wheel, an oscillatory operating member supported independently of and operating upon the pawl to move it positively toward and from the wheel and rotarily of the latter when operated in opposite directions.

11. In a feeding mechanism for microtomes, the combination with a feed-wheel, of a pawl-carrier, a pawl movable on the carrier and adapted to coöperate with the wheel, an oscillatory operating member supported independently of and operating upon the pawl to move it positively toward and from and rotarily of the wheel when oscillated in opposite directions.

12. In a feeding mechanism for microtomes, the combination with a feed-wheel, of a pawl-carrier, a pawl movable on the carrier and adapted to coöperate with the wheel, an oscillatory operating member actuating the pawl positively toward and from and rotarily of the wheel when oscillated in opposite directions and means independent of the operating member for positively disengaging the pawl from the wheel when the member is moved in a direction to turn the wheel.

13. In a feeding mechanism for microtomes, the combination with a feed-wheel, of a pawl-carrier, a pawl movable on the carrier and adapted to coöperate with the wheel, an oscillatory operating member actuating the pawl positively toward and from and rotarily of the wheel when oscillated in opposite directions, and an adjustable stop independent of the member for positively disengaging the pawl from the wheel when the member is moved in the direction to turn the wheel.

14. In a feeding mechanism for microtomes, the combination with a feed-wheel, of a pawl-carrier, a pawl movable on the carrier and adapted to coöperate with the wheel, an oscillatory operating member actuating the pawl positively toward and from and rotarily of the wheel when oscillated in opposite directions and a brake operating upon the wheel to prevent overthrow.

15. In a feeding mechanism for microtomes, the combination with a feed-wheel, of a pawl-carrier, a pawl movable on the carrier and adapted to coöperate with the wheel, an oscillatory operating member actuating the pawl positively toward and from and rotarily of the wheel, a brake operating upon the wheel to prevent overthrow and an adjustable stop for positively disengaging the pawl from the wheel.

16. In a feeding mechanism for microtomes, the combination with a feed-wheel, the pivoted pawl-carrier, the pawl pivoted on the carrier having the projection at the free end, a normally stationary stop with which said projection engages, an oscillatory operating member pivoted to the pawl eccentrically of the pivot of the latter and actuating the pawl toward and from and rotarily of the wheel.

17. In a feeding device for microtomes, the combination with the carriage, an arbor thereon, a screw connected to the carriage and a nut, of the feed-wheel connected to the screw, the pawl-carrier and oscillatory operating member journaled on the arbor, the pawl movable on the carrier and connected to and operated by the operating member.

18. In a feeding mechanism for microtomes, the combination with a movable feed-wheel, an oscillatory operating member, a pawl operated by the latter positively toward and from and rotarily of the wheel and a stop for limiting the movement of the member, of a stationary plate, a movable plate, a stop on the latter with which the pawl coöperates to disengage itself from the wheel when operated in one direction and devices between the stationary and movable plates to indicate their relative adjustment.

19. In a feeding mechanism for microtomes, the combination with a movable feed-wheel, an oscillatory operating member, a pawl operated by the latter, of a stationary plate, having teeth thereon, a movable plate, a stop pivoted on the latter for disengaging the pawl from the wheel and having a pawl or projection engaging the teeth on the stationary plate, substantially as described.

20. In a feeding mechanism for microtomes, the combination with the movable feed-wheel, an oscillatory operating member and a pawl operated by the latter, of a stationary plate having the teeth, an adjustable plate, a pivoted stop on the latter adapted to engage and release the pawl from the wheel having a projection for engaging the teeth on the first-mentioned plate and an index and scale between the stop and stationary plate.

21. In a microtome, the combination with the relatively movable object-holder and knife, of a feed mechanism for moving the object transversely of the plane of the edge of the knife and embodying a micrometer-screw and the detachable nut coöperating therewith, an oscillatory member for intermittently actuating the screw and connections between the member and knife for causing the positive operation of the member to feed the object during the rearward movement of the knife.

22. In a microtome, the combination with a knife and a relatively movable object-carriage, of a micrometer feed-screw and a nut with which it coöperates said nut and screw being detachable to permit the free relative adjustment of the parts in one direction and means for retaining said nut and screw disconnected.

23. In a microtome, the combination with a knife and a relatively movable object-carriage, of a micrometer feed-screw and a nut with which it coöperates, said nut and screw being detachable to permit the free relative adjustment of the parts, retaining means for holding the nut and screw disconnected and means for releasing said retaining means when the parts are at one extreme of their movement.

24. In a microtome, the combination with a knife and object-carriage, of relatively movable parts for causing the relative feed of the knife and carriage and capable of disconnection to permit the free movement of the carriage in one direction, means for holding the movable parts disconnected and means for connecting them when the knife and carriage are at one extreme of their movement.

25. In a microtome, the combination with an object-carriage, of a nut and a relatively movable feed-screw coöperating therewith to cause the feed of the carriage in one direction, the nut and screw being separable by a lateral movement and means for holding the parts separated.

26. In a microtome, the combination with an object-carriage, of a nut and a relatively movable feed-screw coöperating therewith to cause the feed of the carriage in one direction, means for holding the nut in engagement with the screw, means for holding the nut out of engagement therewith and means for releasing the holding means when the carriage is moved to one position.

27. In a microtome, the combination with the object-carriage, of a nut and a relatively movable screw coöperating therewith to cause the feed of the carriage in one direction, a spring for causing the engagement of the nut and screw and a catch for holding the nut out of engagement.

28. In a microtome, the combination with the object-carriage, of a nut and a relatively movable screw coöperating therewith to cause the feed of the carriage in one direction, a spring for causing the engagement of the nut and screw, a catch for holding the nut out of engagement and means for causing the release of the catch when the carriage is moved to one position.

29. In a microtome, the combination with the object-carriage, the screw and the nut movable into and out of engagement with the screw, the spring for operating the nut into engagement, the catch for holding the nut out of engagement with the screw and means for operating the said catch to release the nut when the carriage is at one extreme of its movement.

30. In a feeding mechanism for micrometers, the combination with the feed-screw, the divided nut coöperating therewith, a spring for closing the nut, and a catch arranged between the nut-sections for holding them separated.

31. In a feeding mechanism for microtomes, the combination with the feed-screw and the operating-wheel thereon, of the divided nut, a spring for operating the nut-sections into engagement, and an automatic catch arranged between the nut-sections for holding them separated and adapted to be engaged by the operating-wheel to release the nut-sections.

32. In a feeding mechanism for microtomes, the combination with the feed-screw, and the operating-wheel thereon, of the separable nut-sections having the extended ends or handles, a spring for moving them into engagement with the screw, and a spring-operated catch for holding them separated and having means to be engaged by one of the parts during the relative movement of the screw and nut in one direction.

33. In a feeding mechanism for microtomes, the combination with the feed-screw and the operating-wheel thereon, of the pivoted divided nut-sections having the operating-handles, the spring for operating the nut-sections into engagement, the spring-operated catch arranged between the nut-sections to hold them apart and adapted to be moved out of engagement by one of the movable parts when the screw and nut are at one extreme of their relative movement.

34. In a microtome, the combination with the frame, the separable nut-sections thereon, means for bringing the sections together, the spring-operated catch for holding the sections separated, of the carriage, the screw swiveled thereon and adapted to be engaged by the nut-sections and the operating-wheel for the screw.

35. In a microtome, the combination with the main frame, the reciprocatory knife-block thereon and the knife, of the object-carriage, feeding devices therefor embodying a movable operating-arm, and adjustable stops carried by the knife-block and engaging the arm to actuate it in opposite directions.

36. In a microtome, the combination with the main frame, the reciprocatory knife-block and the knife, of an object-carriage, feeding devices therefor embodying a movable operating-arm, having a portion yielding in one direction only and stops connected to the knife-block for actuating said arm in opposite directions.

37. In a microtome, the combination with the main frame, the reciprocatory knife-block, the knife adjustably secured thereto, an arm on the block adjustable longitudinally thereof and operating-stops on said last-mentioned arm, of an object-carriage, and feeding mechanism for the carriage embodying a movable arm coöperating with the stops connected to the knife-block.

38. In a microtome, the combination with the main frame, the reciprocatory knife-block, the knife adjustably secured thereto, the arm on the block having the stop or projection thereon, and the rod adjustable longitudinally and rotarily on the said arm and having the stop or projection, of an object-carriage, and feeding mechanism therefor embodying a movable arm adapted to be actuated by the stops carried by the knife-block.

39. In a microtome, the combination with the main frame, the reciprocatory knife-block operating therein and the knife, of an object-carriage, a feeding device therefor embodying an oscillatory arm or lever actuating the feeding device when moved in one direction, said lever having a portion yielding in one direction only, and connections between the yielding portion of the lever and the knife-block arranged to cause the positive operation of the feeding mechanism when the lever is moved in one direction and the positive operation of the knife to cut when moved in the opposite direction.

EDWARD BAUSCH.
GEORGE HOMMEL.

Witnesses:
GEO. ZIMMERMANN,
WM. G. WOODWORTH.